United States Patent [19]
Kusters

[11] Patent Number: 5,819,112
[45] Date of Patent: Oct. 6, 1998

[54] APPARATUS FOR CONTROLLING AN I/O PORT BY QUEUING REQUESTS AND IN RESPONSE TO A PREDEFINED CONDITION, ENABLING THE I/O PORT TO RECEIVE THE INTERRUPT REQUESTS

[75] Inventor: Norbert Paul Kusters, Redmond, Wash.

[73] Assignee: Microsoft Corporation, Redmond, Wash.

[21] Appl. No.: 525,464

[22] Filed: Sep. 8, 1995

[51] Int. Cl.⁶ .................................................. G06F 13/00
[52] U.S. Cl. ........................ 395/856; 395/287; 395/828; 395/849; 395/736
[58] Field of Search ....................... 395/200.01, 200.02, 395/500, 733, 741, 822, 828, 885, 287, 736, 849, 856

[56] References Cited

U.S. PATENT DOCUMENTS

| | | | |
|---|---|---|---|
| 4,654,788 | 3/1987 | Boudreau et al. | 395/287 |
| 4,845,609 | 7/1989 | Lighthart et al. | 395/200.01 |
| 5,265,239 | 11/1993 | Ardolino | 395/500 |
| 5,276,443 | 1/1994 | Gates et al. | 395/822 |
| 5,280,618 | 1/1994 | Takagi | 395/733 |
| 5,379,382 | 1/1995 | Work et al. | 395/883 |
| 5,390,321 | 2/1995 | Proesel | 395/500 |
| 5,430,879 | 7/1995 | Murai | 395/741 |
| 5,504,929 | 4/1996 | Blair et al. | 395/885 |
| 5,553,306 | 9/1996 | Claffey-Cohen et al. | 395/828 |
| 5,555,374 | 9/1996 | Armerding et al. | 395/200.02 |

*Primary Examiner*—Thomas O. Lee
*Assistant Examiner*—Po C. Huang
*Attorney, Agent, or Firm*—Jones & Askew, LLP

[57] ABSTRACT

An improved operating system for a personal computer including a method for controlling a parallel I/O port for peer-to-peer communication is disclosed. The improved operating system includes a port driver which supports communication with multiple peripheral devices through a single parallel port. The peripheral devices are connect to the parallel port via a multiplexer and may include non-interrupt devices, master/slave devices, and peer-to-peer devices. The parallel port driver includes a port arbitrator and a plurality of class device drivers to control access to the parallel port. Each class device driver communicates with a particular class of devices connected to the port. The port arbitrator controls access to port by the various class device drivers. The parallel port includes configurable control registers that include interrupt control bits for enabling and disabling interrupts communicated by peripheral devices. A device driver may set the interrupt control bits so as to disable the port for receiving certain interrupt requests from peer-to-peer devices. The port arbitrator monitors the status of the port and enables the port to receive interrupt requests from peer-to-peer devices when a predefined condition is detected.

15 Claims, 8 Drawing Sheets

APPARATUS FOR CONTROLLING AN I/O PORT BY QUEUING REQUESTS AND IN RESPONSE TO A PREDEFINED CONDITION, ENABLING THE I/O PORT TO RECEIVE THE INTERRUPT REQUESTS

TECHNICAL FIELD

The present invention relates to a computer operating system and more particularly to an improved method and system for controlling a parallel port for peer-to-peer communication in a personal computer system.

BACKGROUND OF THE INVENTION

A computer, particularly a personal computer, has one or more input/output communication ports (I/O ports) for communicating with peripheral devices such as keyboards, mice, monitors, speakers, modems, scanners, digitizers, printers, and the like. The basic I/O ports in a typical personal computer system are the serial and parallel ports. Serial ports are conventionally used to communicate with devices that communicate asynchronously (i.e., without a synchronizing clock signal) such as mice and keyboards. Serial ports are also conventionally used for devices that communicate bi-directionally with the computer system such as modems, scanners, and digitizers. Parallel ports, on the other hand, are conventionally used primarily for devices that communicate in the output direction only such as printers.

The serial port has conventionally been the primary bi-directional communication device for a personal computer. The serial port communicates data one bit at a time with a string of eight bits forming a byte. A single bit called the start bit precedes each word to signal to the computer system that a series of data bits will follow. The computer system uses the start bit to recognize that the following bits represent data. Thus, asynchronous communication of data, such as that transmitted by a typist at a keyboard, may be received and recognized via the serial port.

The parallel port, on the other hand, communicates data eight bits at a time. Therefore, a parallel port is a faster communication device than a serial port. Parallel ports are conventionally dedicated to a single device, typically a printer. While a parallel port may be configured to communicate with devices using different communication protocols, the number of parallel ports supported by a central processing unit (CPU) of a personal computer is limited. Thus, there is a need to use a single parallel port to serve peripheral devices that use different communication protocols and that are selectively connected to the port via a multiplexer.

A multiplexer is an external mechanism for connecting several peripheral devices to a single parallel port. Connecting a parallel port to a multiplexer allows a number of devices to be connected to a single interrupt request (IRQ) pin on a typical CPU. Similarly, a parallel port may also be used for communication between and among computer systems by connecting the parallel cable connector of an I/O card to a network via a network adapter. Through a network, a computer may be connected with a large number of other computers as well as other peripheral devices. Network adapters generally communicate bi-directionally with the host computer system over the parallel port. In addition, network adapters generally communicate asynchronously and may initiate communications with the host computer system. It would be advantageous for an operating system to support I/O communications whereby an I/O card may be connected to a multiplexer which in turn may be connected to peripheral devices such as modems, printers, scanners, and one or more network adapters. In this manner, a computer could be connected to a great number of peripheral devices through its parallel port.

Peripheral devices connected to a parallel port via a multiplexer may use different modes of communication. Simple devices such as older printers and disk drives may not use interrupt requests at all. These "non-interrupt" devices simply accept data when delivered and send data when prompted. The parallel port must be dedicated to these "non-interrupt" devices during the entire course of the communication. For example, writing to a printer that is not interrupt capable may require filling the printer's buffer several times. The buffer can be filled quickly, but the printer may take much longer to actually print the data in the buffer. The printer, however, must maintain control over the parallel port while the printer is printing because the printer has no way to signal the computer when it's buffer is empty and it is ready for more data. Modems, drives, scanners, digitizers, and other peripheral devices (i.e., virtually all devices that store, transmit, or manipulate data using a buffer) exhibit this timing characteristic. Allocating the parallel port full time to a peripheral device is not a problem when the parallel port is only connected to a single device. In more advanced systems having a number of peripheral devices connected to a single parallel port, it would be advantageous, however, to disconnect devices from the port when the port is not being used to transmit data so that the port can be used to service another peripheral device while the first device is processing the data in the buffer.

Other devices such as modern disk drives and CD-ROM drives operate in what is known as a "master/slave" mode. Like non-interrupt devices, master/slave devices accept data whenever it is sent and send data only when prompted. Master/slave devices, however, transmit an interrupt request when they are finished reading or writing data. Therefore, the port can be freed while the device reads data from or writes data to its storage medium. This mode of operation improves the speed of I/O communications considerably. A master/slave device, however, does not initiate an I/O communication. An interrupt request output by a master/slave device is always a response to a previous instruction from the computer system.

Network adapters, on the other hand, operate in a "peer-to-peer" mode. Like master/slave devices, peer-to-peer devices transmit an interrupt request prior to sending data. A peer-to-peer device, however, does not always send an interrupt request in response to a previous instruction from the host computer. Rather, a peer-to-peer device, typically a network adapter, may use an interrupt request signal to initiate an I/O communication with the receiving computer.

It would be advantageous for the computer's operating system to support a number of peripheral devices connected to a single parallel port via a multiplexer, including non-interrupt devices such as printers, master/slave devices such as CD-ROM drives, and peer-to-peer devices such as network adapters. This configuration, however, was not possible in the prior art because different devices using the parallel port at different times may use different communication protocols including the protocols for recognizing device interrupt requests. The specific nature of the problem is described with more particularity below.

The problem overcome by the present invention occurs when several peripheral devices, including a peer-to-peer device and other peripheral devices, are connected to a single parallel port via a multiplexer. Specifically, the protocol used by one or more of the peripheral devices may set the interrupt control bits of the control register on the I/O card so that a reverse data interrupt request used by a peer-to-peer device is disabled. For example, when a printer is connected to the I/O card, its protocol may require that the interrupt control bit for pin 15 of the cable connector be set to "zero." However, a peer-to-peer device may require that the same control bit be set to "one" to enable interrupt requests. Thus, when the printer uses the port, it may leave the I/O card disabled for firing a CPU interrupt request in response to the peer-to-peer device interrupt request resulting from latching pin 15.

A prior art solution to this problem is simply to avoid connecting a peer-to-peer device and other peripheral devices to the same parallel port. This solution requires that the computer have more than one parallel port available for connecting peripheral devices if one is to be used for network communications. This solution is inadequate because it causes an apparent malfunction when a user connects the parallel port to a multiplexer that is used to connect a network adapter and other peripheral devices to the same port. A typical user who finds this pitfall is not apprised of the source of the problem and is left groping for a solution. Moreover, solving the problem requires connecting the network to a separate parallel port. This solution may not be possible without adding cables and/or another parallel port to the user's computer system. In addition, this solution is inadequate for many laptop computers that typically have only one parallel port.

Another prior art solution to the problem is a small computer system interface (SCSI) device. A SCSI device is external to the computer and offers multiple connections to peripheral devices and one connection to a parallel port. The SCSI device includes programmable intelligence that allows the SCSI device to communicate with the I/O card so that it can service peer-to-peer as well as other peripheral devices using a standard parallel port. However, this solution is expensive because it requires the use of a separate external device to solve the problem.

Thus, there is a great need for an improved method and system for controlling a parallel port for peer-to-peer communication in a personal computer system. It would be advantageous for such a system to support communication with peer-to-peer devices and other peripheral devices using the same parallel port without having to rely on a device external to the computer system. It would also be advantageous for such a system to operate with standard I/O cards using standard cable connectors. It would also be advantageous for such a system to support older, less sophisticated peripheral devices.

SUMMARY OF THE INVENTION

The present invention meets the above objectives by providing an operating system for a personal computer with an improved method and system for controlling a parallel port for peer-to-peer communication. The improved operating system supports communication with peer-to-peer devices and other peripheral devices using a single parallel port without having to rely on an external device such as a SCSI device. For example, a multiplexer may be used to selectively connect a plurality of devices to a single parallel port including a non-interrupt device such as a printer, a master/slave device such as a CD-ROM, and a peer-to-peer device such as network adapter.

The inventive operating system has a parallel port driver that controls access to the parallel port. The parallel port driver includes a port arbitrator and a number of class device drivers. Each class device driver contains the information and instructions necessary to communicate with a particular class of peripheral devices that may be connected to the parallel port. The port arbitrator controls access to the parallel port by the various class device drivers. For example, a multiplexer may selectively connect a printer, a modem, a scanner, and a network adapter to a single parallel port. The port driver for that parallel port might include a first class device driver for the printer, a second class device driver for the modem, a third class device driver for the scanner, and a fourth class device driver for the network adapter. Each of these class device drivers may have exclusive control over the port to communicate with its device. The port arbitrator sequentially allocates control over the port to the various class device drivers. For example, the printer driver may have control over the parallel port for printing. When the printer driver is finished using the parallel port, the modem may have control over the parallel port for transmitting data. When the modem is finished using the parallel port, the network adapter may have control over the parallel port for network communications.

A class device driver conducts I/O communication with a peripheral device by transmitting an I/O request packet (IRP) to the peripheral device. An I/O request packet (IRP) is a waitable unit of programming code and data that can be queued for execution by the CPU. An I/O request packet (IRP) specifies the particulars of an I/O communication, such as how many bytes of data, where to get the data, where to send the data, which buffer to use, etc. I/O request packets (IRPs) are used to write data to and read data from a peripheral device. A class device driver may have to wait to process an I/O request packet (IRP) if the port is busy. In this case, the class device driver passes an allocate request to the port arbitrator and places the I/O request packet (IRP) in a queue. The port arbitrator maintains the queue to allocate requests that are received while the parallel port is busy. The queued allocate requests are sequentially processed when the port becomes free.

Typically, an I/O request packet (IRP) is created by the CPU in response to instructions from an application program. The I/O request packet (IRP) is then passed to the class device driver that supports the peripheral device that is to receive the I/O request packet (IRP). The class device driver then attempts to allocate (i.e., gain control over) the parallel port. If the parallel port is idle, the driver allocates the port and transmits the I/O request packet (IRP) to the peripheral device. If the port is busy, the class device driver queues the I/O request packet (IRP) and passes an allocate request to the port arbitrator which queues the allocate request. The port arbitrator then monitors the status of the parallel port, and when the port becomes free, the port arbitrator passes the allocate request on the top of the queue to the appropriate class device driver. The class device driver then obtains exclusive control over the parallel port and transmits the I/O request packet (IRP) to the peripheral device.

A class device driver having exclusive control over the parallel port for the purpose of communicating an I/O request packet (IRP) first configures the control registers (i.e., sets the control bits) so that the I/O card is configured to utilize the class device driver's communication protocol. By configuring the I/O card, the parallel port may be disabled from receiving device interrupt requests from other devices.

In order to enable the port to receive device interrupt requests, the inventive operating system includes an interrupt service routine (ISR) for each class device driver supporting a peripheral device that uses device interrupt requests (master/slave and peer-to-peer devices) and a deferred port check routine (DPCR) for each class device driver supporting a device that uses device interrupt requests that can be disabled by other class device drivers (peer-to-peer devices). During system initialization the class device drivers register their interrupt service routines (ISRs) and deferred port check routines (DPCRs) with the port arbitrator. In turn the port arbitrator maintains a registered list of interrupt service routines (ISRs) and deferred port check routines (DPCRs) for use in controlling the flow of data through the parallel port.

An interrupt service routine (ISR) is a software unit that is used by a class device driver to respond to a device interrupt request. The parallel port may be connected to a plurality of peripheral devices, but it has only one IRQ line connected to the CPU. Therefore, when the I/O card fires a CPU interrupt request to the CPU, the port arbitrator determines which class device driver to call. Preferably, the multiplexer can provide this information to the port arbitrator. If not, the port arbitrator polls the peripheral devices that might have sent a device interrupt request by calling each interrupt service routine (ISR) in the registered list in sequence.

A called interrupt service routine (ISR) allocates the parallel port for the purpose of interrogating its peripheral device and instructs the multiplexer to connect its peripheral device to the parallel port. The interrupt service routine (ISR) then determines whether the peripheral device needs service. If the polled peripheral device does need service, the interrupt service routine (ISR) consumes (i.e., services) the device interrupt request usually by obtaining an I/O request packet (IRP) from the CPU and transmitting it to the peripheral device. The interrupt service routine (ISR) then frees the parallel port. If the peripheral device does not need service, the class device driver frees the parallel port, and the next interrupt service routine (ISR) in the registered list is called. The port arbitrator sequentially calls the interrupt service routines (ISRs) in the registered list until the device interrupt request is serviced or until all of the interrupt service routines (ISRs) have been called.

A deferred port check routine (DPCR) is a software unit used by a class device driver to set the interrupt control bits in order to enable the I/O card to fire a CPU interrupt request to the CPU in response to a device interrupt request signal latched by a peripheral device. The port arbitrator monitors the status of the parallel port and acquires control over the parallel port in response to predetermined conditions. After taking control of the parallel port, the port arbitrator then calls each deferred port check routine (DPCR) in the registered list. If the I/O card fires a CPU interrupt request after the deferred port check routines (DPCRs) have been called, the port arbitrator determines which class device driver to call in response to the CPU interrupt request.

In the preferred embodiment, the port arbitrator monitors the status of the parallel port and acquires control over the parallel port for the purpose of calling the deferred port check routines (DPCRs) in the registered list whenever the allocate request queue is empty and the parallel port is free. The preferred embodiment includes a method of polling peripheral devices to identify peripheral devices that require interrupt service in order to support older multiplexers that have little or no intelligence.

Generally described, the present invention is a method and system for controlling the flow of data through an I/O port in a computer system. The computer system includes a memory and a CPU, and the I/O port is connected to the CPU and to first and second peripheral devices. The CPU is operable for creating I/O request packets (IRPs) for transmitting data to and receiving data from the first and second peripheral devices in response to CPU interrupt requests received by the CPU. The I/O port has a first interrupt control register for enabling the I/O port to transmit a CPU interrupt request to the CPU in response to a device interrupt request received from the first peripheral device and a second interrupt control register for enabling the I/O port to transmit a CPU interrupt request to the CPU in response to a device interrupt request received from the second peripheral device.

The inventive system includes a first class device driver operable for transmitting I/O request packets (IRPs) from the CPU to the first peripheral device, a second class device driver operable for transmitting I/O request packets (IRPs) from the CPU to the second peripheral device, and a port arbitrator having a queue for allocate requests.

Pursuant to the inventive method, the status of the I/O port is monitored by the port arbitrator. A first I/O request packet (IRP) for the first peripheral device is received by a first class device driver, and the first class device driver takes control of the I/O port. A second I/O request packet (IRP) for the second peripheral device is received by the second class device driver, and an allocate request corresponding to the second I/O request packet (IRP) is queued by the port arbitrator. The first I/O request packet (IRP) is transmitted to the first peripheral device, and then in response to the I/O port being idle, the allocate request is retrieved by the port arbitrator from the queue. The second class device driver then takes control over the I/O port and transmits the second I/O request packet (IRP) to the second peripheral device. Then, in response to a predefined condition, the I/O port is enabled to receive device interrupt requests from the first and second peripheral devices.

According to another aspect of the present invention, the I/O port is enabled to receive device interrupt requests from the first and second peripheral devices whenever the queue for allocate requests is empty and the I/O port is idle.

While the preferred embodiment of the present invention is disclosed in the context of an a standard parallel port using a standard I/O card with a standard 25 pin connector, those skilled in the art will appreciate that the principles of the present invention may be applied to virtually any type of operating system for I/O communication that uses a configurable I/O port to selectively communicate with a plurality of peripheral devices.

Therefore, it is an object of the present invention to provide an improved method and system for controlling a parallel port for peer-to-peer communication.

It is further object of the present invention to provide an improved method for controlling the flow of data through a parallel port that provides for communication with peer-to-peer devices and other peripheral devices using the same parallel port without relying on an external device with programmable intelligence capable of communicating with the I/O card such as an SCSI device.

It is further object of the present invention to provide an improved method for controlling the flow of data through a parallel port whereby a multiplexer may be used to connect a plurality of devices to the parallel port including non-interrupt devices, master/slave devices, and peer-to-peer devices.

It is a further object of the present invention to provide an improved method for controlling the flow of data through a parallel port whereby a multiplexer with little or no intelligence may be used to connect a plurality of devices to the parallel port including non-interrupt devices, master/slave devices, and peer-to-peer devices.

That the present invention and the preferred embodiments thereof improve over the drawbacks of the prior art, and accomplish the objects of the invention set forth above will become apparent from the following detailed description of the preferred embodiments. Further objects and advantages of the present invention may become apparent from a review of the following detailed description of the preferred embodiments and the appended claims and drawings.

DESCRIPTION OF THE PREFERRED EMBODIMENT

The detailed description which follows is presented largely in terms of processes and symbolic representations of operations of data bits manipulated by a processing unit and maintained within data structures supplied by one or more memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a method or process is generally conceived to be a sequence of computer-executed steps leading to a desired result. These machine-implemented steps, which can be maintained as in the form of a program module, generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files, or the like. It should be kept in mind, however, that these and similar terms should be associated with appropriate physical quantities for computer operations, and that these terms are merely conventional labels applied to these physical quantities that exist within the computer.

In addition, it should be understood that the programs, processes, methods, etc., described herein are not related or limited to any particular computer, single chip processor, or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Generally described, a personal computer system includes a central processing unit interconnected by way of a system bus with a system memory, one or more internal I/O devices such as disk drives that are directly connected with the system bus, and one or more I/O cards that are directly connected with the system bus. The I/O cards generally include adapters or cable connectors for receiving one or more serial and/or parallel communication cables that are used to communicate with external I/O devices. An I/O card thus provides an interface between the system bus and one or more external I/O devices that are not directly connected to the system bus. Such devices generally include the keyboard, mouse, monitor, and speaker that form the basic elements of the user interface, and other peripheral devices such as printers, scanners, digitizers, modems, and the like. In addition, I/O cards are used to interconnect the computer with other computers and devices on a network.

The CPU is located on a motherboard which has embedded within it a number of electrical conductors or lines that connect the various pins of the CPU with slots on the edge of the motherboard that are adapted to connect to other system components. The connections to the motherboard for the system bus include, among others, the data bus and the address bus. A bus is a series of connections or wires designed to carry common signals. Each wire carries one bit of information. A CPU with a sixteen bit word, such as an 80286, has sixteen lines connecting to the data bus and therefore can send or receive data sixteen bits at a time. More advanced CPUs beginning with the 80386 chip use a 32 bit data bus, and the 80586 chip uses a 64 bit data bus. The address bus is a set of wires used to designate the memory location to which the data is being stored, or from which the data is being retrieved. The number of bits of the address bus defines the maximum amount of Random Access Memory (RAM) that the CPU can address.

The computer system has a distinct hierarchy of software that controls the operation of the system at all times. Communications generally occur only between adjacent levels in the hierarchy although there are some exceptions. The hardware, primarily the CPU and system memory, is at the lowest level in the hierarchy. External devices are controlled by placing bytes of information in certain predefined locations within the system memory known as "ports". Such a memory address port is connected via the system bus to an I/O card and via the I/O card to a cable connector. The cable connector is then connected to a peripheral device. The term "port" is therefore used to refer to a number of computer system components that, in combination, provide for transmitting data from a memory address port to a peripheral device. Specifically, the term "port" as used herein includes a memory address port, all or part of an I/O card, and a cable connector. It will be appreciated that using a port also involves the use of the system bus and the CPU.

Prior operating systems include discrete programming units for communicating with a peripheral device via an I/O port. The software unit within the operating system that controls communication through a port is known as a "port driver." A port driver contains the information and instructions necessary to communicate using an I/O port, and usually must be specifically configured to communicate with a particular device that will use the port. Particularly, the port driver includes a device driver for each peripheral device connected to the I/O port. For example, a "keyboard driver" may support keyboard and mouse communications over one serial port, while a "modem driver" may support modem communications over another serial port, and a "printer driver" may support printer communications over a parallel port. The device driver for each of these devices is configured to communicate with its particular type of device.

The basic input-output (BIOS) system, which is at the next level in the hierarchy, is usually located on Read Only Memory (ROM) and is specific to the computer that it supports. The BIOS, which is the software element between the hardware and the operating system, receives instructions from the operating system and translates the instructions into manipulations of the ports. The BIOS provides a uniform interface between the operating system and the specific hardware configuration of a particular computer allowing standardization of operating system instructions used to control the hardware of different computers. A standardized operating system such as OS/2 or WINDOWS provides the next level in the hierarchy. Application programs such a word processors and spreadsheets operate at the next level in the hierarchy.

The operating system provides the interface between the CPU and the application programs. The application programs issue instructions for the CPU to perform, and the operating system instructs the CPU to process these instructions in an orderly manner. The CPU executes instructions using the system bus to communicate data. For example, the CPU may read several bytes of data from memory using the system bus, manipulate the data, and store the result in memory using the system bus.

The operating system organizes the instructions from application programs into chunks called "threads." A thread can be thought of as a "waitable" software capsule of instructions that can be queued for execution by the CPU. The operating system can break the operation of multiple applications into threads for sequential execution, thus allowing the CPU to simultaneously support several application programs. This capability is known as multi-tasking. Advanced operating systems, such as WINDOWS NT version 3.5, manufactured by Microsoft Corporation, Redmond, Wash., assignee of the present application, are operable to support multi-tasking from more than one CPU simultaneously, thus increasing the functionality and computing capacity of the computer system.

Multi-tasking increases the speed of a computer's operations by allowing I/O devices to operate without idling the CPU. Generally, the CPU can perform instructions much more quickly than data can be written to or read from a storage device such as a disk drive. Therefore, the CPU would be idled if it had to wait for data to be written to or read from a storage device. The use of waitable threads allows the operating system to reassign the CPU whenever a task must be performed by a slower component of the system. For example, the processing of instructions from a first application program may be suspended whenever data must be read from a disk drive. The CPU may then execute a thread from another application program while the data is being read and resume processing of the instructions from the first application program once the data has been read. Thus, the main program running on a CPU is interrupted for a short period during which an I/O device is set into action filling its data buffer. The CPU then resumes processing the instructions of the main program until the I/O device is ready to send the data. The I/O device then interrupts the CPU and delivers the data. Organizing the operation of the computer system in threads provides convenient points in time between threads when the computer system can be interrupted so that an I/O device can be serviced.

The multi-tasking capability of advanced operating systems, such as WINDOWS NT version 3.5, greatly increases the functionality of personal computers and supports multiple CPUs, multiple application programs, and multiple users simultaneously. Multi-tasking therefore also increases the likelihood that users will desire to connect a large number of peripheral devices to the computer simultaneously. Similarly, multi-tasking also increases the likelihood that users will desire to connect the computer to a network providing access to bilateral communication with a large number of peripheral devices.

Generally, there is only one system bus in a computer. Therefore, the CPU can execute only one instruction at a time. Because using a port requires the use of the CPU and the system bus, communication with an I/O device requires that the main program operation of the CPU be temporarily suspended while the CPU and the system bus are used to complete the I/O communication. The operating system controls the flow of instructions to the CPU from application programs and the temporary suspension of CPU processing of application program instructions to allow for I/O communication.

A device interrupt request is a signal sent by a peripheral device via an I/O card to the CPU indicating that the peripheral device requires I/O servicing, usually writing data to or reading data from the peripheral device. The CPU has specific pins ((IRQ) pins) dedicated to receiving resulting CPU interrupt requests. For example, a specific set of pins is typically dedicated to connection with the I/O card that, in turn, is adapted to receive cables for connection to various peripheral devices.

Size limits the number of pins on a CPU that can be dedicated to communicating with peripheral devices via the I/O card. In general, only one IRQ pin is provided for each interrupt-capable port that a CPU supports. For example, 80286, 80386, 80486, and 80586 chips all have one IRQ pin for each parallel port although they support differing numbers of ports. In each case, only a few IRQ pins are available. Therefore, computer users may find that they would like to connect more interrupt-capable peripheral devices to a computer than the CPU has IRQ pins.

The operating system therefore must be able to support a large number of peripheral devices and to support bilateral communication, preferably via the parallel port. Moreover, the physical size of the computer housing is a limiting constraint in the design of portable laptop computers. Therefore, laptop computers are typically provided with only a single I/O card having a single connector for a parallel cable. Thus, laptop computer users have a great need to serve a large number of peripheral devices using a single parallel port connection.

The specific nature of the problem addressed by the preferred embodiment of the present invention will be explained more clearly with reference to the specific details of standard I/O hardware. Specifically, the parallel port slot for an I/O card generally has a standard 25 pin connector including eight data lines and ten control lines. The control lines are used to communicate control information between the computer system and a peripheral device. The I/O card connects the eight data lines to the data bus and connects one or more control lines to an IRQ pin of the CPU for receiving CPU interrupt requests. Most devices use a standard pin (i.e., pin 10 in a standard 25 pin connector) for sending a device interrupt request. A peer-to-peer device, such as a network adapter, typically uses a second pin (i.e., pin 15 in a standard 25 pin connector) for sending a device interrupt request to the host computer. The device interrupt request on pin 15 initiates a reverse I/O communication with the host computer. Therefore, the reverse data interrupt request (i.e. the interrupt on pin 15) is the only indication that the receiving computer will get to alert it that the peer-to-peer device has data to send.

A peripheral device communicates with the I/O card by "latching" a line, i.e. by holding the voltage at a value recognized as a "one" or "zero" by the computer system. A parallel port has a number of control registers that are typically located on the I/O card. The control registers located on the I/O card constitute a physical station that is intermediate the peripheral device and the memory address port for controlling the operation of the I/O port. These control registers are used to set communication protocol and to determine when signals will be accepted on various lines (i.e., to enable communication). A control register may include a number of control bits for controlling the protocol of a particular line. For example, a control bit may be used to determine whether a "high" voltage latched to a line is interpreted as a "one" or a "zero." In addition, one or more control bits can serve as interrupt control bits that are used to control when the I/O card will accept a device interrupt request and will "fire" a CPU interrupt request to the CPU. The I/O card has a number of control lines connected to it on the peripheral device side but only one IRQ line on the CPU side. Thus, the interrupt control bits are use to control when signals received on various control lines will be accepted as device interrupt requests and will cause the I/O card to "fire" a CPU interrupt request to the CPU. The terms "interrupt control bits", "interrupt enabling bits", and "interrupt control registers" are used synonymously. Similarly, the terms "control bits" and "control registers" are used synonymously.

A CPU interrupt request is said to "fire" when an I/O card latches the required voltage on the line to an IRQ pin of the CPU. The firing of a CPU interrupt request will generally cause the CPU to suspend processing at the conclusion of the currently executing thread and to respond to the CPU interrupt request. An I/O card will fire a CPU interrupt request only when a device interrupt line coming from the peripheral device is latched (i.e., the peripheral device has sent a device interrupt request by latching the interrupt line from the peripheral device to the I/O card) and when the CPU interrupt request has been enabled (i.e., the operating system has configured the I/O card to transmit such a CPU interrupt request from the I/O card to the CPU by properly setting the interrupt control bits). Thus, the operating system maintains ultimate control over the firing of CPU interrupt requests from the I/O card by maintaining control over the interrupt control bits.

Figure 1:
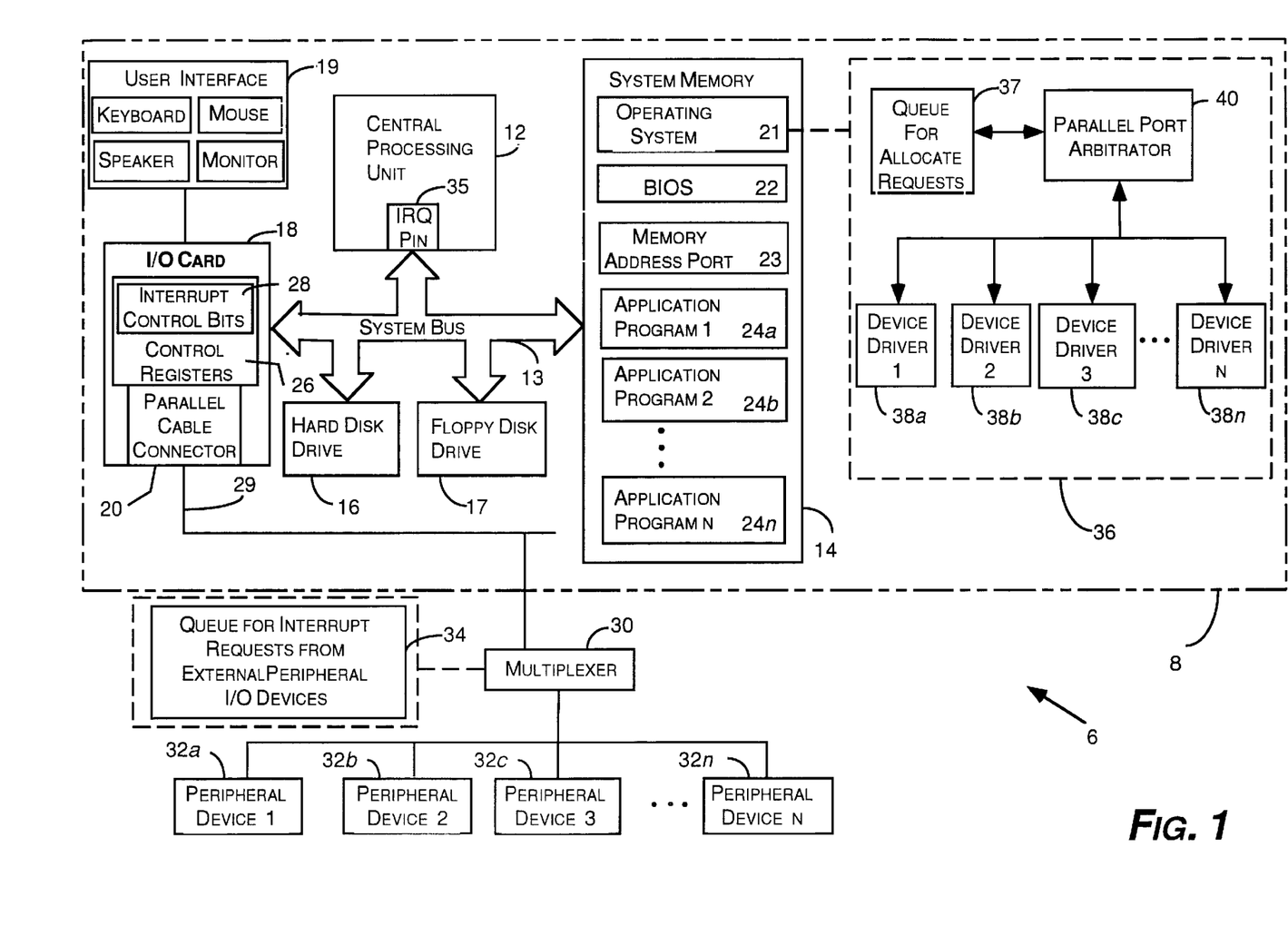
FIG. 1 is a functional block diagram of a personal computer system having a parallel port connected to a plurality of peripheral devices by means of a multiplexer.

FIG. 1, shows the preferred operating environment 6 for the present invention which includes a personal computer system 8 interconnected by means of a multiplexer 30 to a plurality of external peripheral I/O devices 32a through 32n.

The peripheral devices 32a through 32n are connected to multiplexer input ports 33a through 33n and may include printers, scanners, digitizers, modems, network adapters, and the like. Each peripheral device 32a through 32n may be a group of peripheral devices which share a common protocol and therefore may share a common software device driver. Computer system 8 may be any of a variety of IBM or IBM-compatible personal computers that can run in a protected mode, such as those known as AT or PS/2 compatibles with 80386 or greater processors. Computer system 8 includes a central processing unit (CPU) 12 connected by way of a system bus 13 with a system memory 14 and internal I/O devices including a hard disk drive 16 and a floppy disk drive 17. The system bus 13 also connects the CPU 12 with an I/O card 18 that is used to connect the plurality of external I/O devices 32a through 32n to the computer system 8. The I/O card 18 has one or more serial cable connectors (not shown) that are connected to the keyboard, mouse, monitor, and speaker that form the basic elements of the user interface 19. The I/O card 18 also has a parallel cable connector 20 that is connected via multiplexer 30 to the plurality of external peripheral devices 32a through 32n.

The CPU 12 is typically implemented as a microprocessor, such as the models 80386, 80486 or 80586 manufactured by Intel Corporation, Santa Clara, Calif. The CPU 12 is located on a motherboard (not shown) which has embedded within it a number of electrical conductors or lines that connect the various pins of the CPU with slots on the edge of the motherboard that are adapted to connect to other system components. The connections to the motherboard for the system bus 13 include, among others, the data bus and the address bus.

The CPU 12 communicates, by means of control, address, and data signals, with the software resident within system memory 14 including operating system 21. The preferred embodiment of the present invention is implemented as part the WINDOWS NT version 3.5 operating system, manufactured by Microsoft Corporation, Redmond, Wash., assignee of the present application. The computer system 8 has a distinct hierarchy of software retained in the system memory 14 that controls the operation of the computer system at all times. Communications generally occur only between adjacent levels in the hierarchy although there are some exceptions. The hardware, primarily the CPU 12 and system memory 14, is at the lowest level in the hierarchy. External I/O devices 32a through 32n and 19 are controlled by the basic input-output system (BIOS) 22 which is at the next level in the hierarchy. The BIOS 22 writes or reads bytes of information to or from memory address ports, such as memory address port 23, which ports are predefined locations within the system memory 14. Memory address port 23 is the particular memory address port that is dedicated to communicating with the multiplexed plurality of peripheral devices 32a through 32n that are connected to the parallel cable connector 20 on the I/O card 18.

The BIOS 22 is usually located on a Read Only Memory (ROM) chip (not shown) and is specific to the computer that it supports. The BIOS 22 interfaces between the CPU 12 and the operating system 21 by receiving instructions from the operating system and translating the instructions into manipulations of the memory address ports including memory address port 23. The BIOS 22 provides a uniform interface between the operating system 21 and the specific hardware configuration of a particular computer, primarily CPU 12 and system memory 14, allowing standardization of operating system instructions used to control the hardware of different computers.

A standardized operating system 21, preferably WINDOWS NT version 3.5, provides the next level in the hierarchy. Application programs 24a through 24n operate at the next level in the hierarchy in conjunction with the operating system 21 to perform specialized functions. Common application programs include word processors, spread sheets, databases, games, etc. In performing their specialized functions, the application programs 24 send I/O instructions to the operating system 21. In response, the operating system 21 sends I/O instructions to the BIOS 22 which implements the instructions by writing data to or reading data from a memory address port such as memory address port 23.

The operating system 21 is installed in a mass storage device, such as a hard disk drive 16, a floppy disk drive 17, or a read only memory (ROM) chip (not shown). During boot up (initialization) of the computer system 8, the operating system 21 is loaded into the system memory 14. During boot up, the BIOS 22 is also loaded into the system memory 14. During operation, one or more of the application programs 24a through 24n are also loaded into system memory 14 from the hard disk drive 16 or the floppy disk drive 17. The BIOS 22 supplies the device-level control or support services for the primary I/O devices of the computer, such as the components of the user interface 19 and the multiplexed plurality of external peripheral devices 32a through 32n. After boot up, the BIOS 22 accepts requests from application programs 24a through 24n and from the operating system 21 running on the computer system 8 and performs I/O services as requested by those programs.

The operating system 21 provides the interface between the CPU 12 and the application programs 24a through 24n. The application programs 24a through 24n issue instructions for the CPU 12 to perform, and the operating system 21 instructs the CPU 12 to process these instructions in an orderly manner. The CPU 12 executes instructions using the system bus 13 to communicate data. For example, the CPU 12 may read several bytes of data from system memory 14 using the system bus 13, manipulate the data, and then store the result in the system memory 14 using the system bus 13.

The I/O card 18 includes a standard 25 pin adapter or parallel cable connector 20 for receiving a parallel communication cable 29 that is used to communicate with the multiplexed plurality of external I/O devices 32a through 32n. The I/O card 18 provides an interface between the system bus 13 and the multiplexed plurality of external I/O devices 32a through 32n that are not directly connected to the system bus 13. The I/O card 18 includes control registers 26 including one or more interrupt control bits 28. The control registers 26 are used to control the parallel communication protocol of the I/O card 18 including the handling of device interrupt requests from peripheral devices 32a through 32n. Thus, the memory address port 23 is connected via the system bus 13 to the parallel communication facilities of I/O card 18 and is connected via the I/O card 18 to a parallel cable connector 20. The parallel cable connector 20 is then connected via a parallel communication cable 29 and multiplexer 30 to the plurality of peripheral devices 32a through 32n. It will be appreciated that the term "port" is used to refer to a number of components that, in combination, transmit data from a memory address port to a peripheral device. Specifically, the term "port" as used herein includes a memory address port 23, the parallel communication facilities of I/O card 18, and a 25 pin parallel cable connector 20. It will be appreciated that using a port also involves the use of the system bus 13 and the CPU 12.

The parallel cable connector 20 is connected via a standard 25 wire parallel communication cable 29 to multiplexer 30. The multiplexer 30 is operable for selectively connecting the plurality of peripheral devices 32a through 32n to the parallel cable connector 20 on the I/O card 18. The multiplexer 30 includes a queue 34 for storing device interrupt requests received from peripheral devices 32a through 32n so that the interrupt requests can be sequentially delivered to the computer system 8. Thus, the multiplexer 30 may connect a first peripheral device 32x to the parallel cable connector 20 of the I/O card 18. While the first peripheral device 32x is using memory address port 23, the multiplexer 30 may receive and queue device interrupt requests from other peripheral devices 32a through 32n that are not connected at present to the I/O card 18. The multiplexer 30 then sequentially delivers the device interrupt requests in the queue 34 to the computer system 8 when the port becomes free.

The operating system 21 includes a port driver 36 that includes a queue 37 for allocate requests, class device drivers 38a through 38n corresponding to classes of peripheral devices 32a through 32n, and a parallel port arbitrator 40. Each class device driver 38x contains the information and instructions necessary to communicate with its corresponding class of peripheral devices 32x. The port arbitrator 40 uses the queue 37 to control access to the memory address port 23 by the various class device drivers 38a through 38n.

The peripheral devices 32a through 32n may include peripheral devices that use device interrupt requests. A device interrupt request is a signal sent by a peripheral device 32x to the CPU 12 indicating that the peripheral device 32x requires servicing, usually writing data to or reading data from the peripheral device. The CPU 12 has a specific IRQ pin 35 dedicated to receiving CPU interrupt requests associated with the memory address port 23. Typically, a specific set of CPU pins are dedicated to connection with I/O cards including I/O card 18. Each memory address port, including memory address port 23, generally has at most one IRQ pin associated with it. Thus, the multiplexer 30 selectively connects the peripheral devices 32a through 32n to the same IRQ pin 35 on the CPU 12.

Peripheral devices 32a through 32n may include devices that use different modes of communication, such as non-interrupt devices, master/slave devices, and peer-to-peer devices. A peripheral device 32x communicates with the I/O card 18 by "latching" a line, i.e. by holding the voltage at a value recognized as a "one" or "zero" by the computer system 8. The I/O card 18 has a number of control registers 26. The control registers 26 provide a physical station that is intermediate the peripheral device 32x and the memory address port 23 for controlling the operation of the port. The control registers 26 are used to set parallel communication protocol and to determine when signals will be accepted on various lines (i.e., to enable communication). The control registers 26 include interrupt control bits 28. The interrupt control bits 28 specify when the latched I/O card 18 will accept a device interrupt request and fire a resulting CPU interrupt request to the CPU.

The I/O card 18 preferably includes an advanced parallel port operable as an Extended Capabilities Port (ECP), such as models FDC37C665 and FDC37C666 manufactured by Standard Microsystems Corporation of Hauppauge, N.Y. An ECP operates in accordance with the Extended Capabilities Port Protocol and ISA Interface Standard. The I/O card 18 includes a standard 25 pin parallel cable connector 20 which is connected to the multiplexer 30 by a standard 25 wire parallel communications cable 29. Data pins 2 through 9 are used to communicate data, and control pins 1 and 10 through 17 are used to communicate control information. Pin 10 is used by peripheral devices using interrupt requests for sending a conventional interrupt request signal. In addition, I/O card 18 supports peer-to-peer devices such as network adapters that use pin 15 to signal a device interrupt request to initiate I/O communications with the computer 8. The control registers 26 for I/O card 18 include among the interrupt control bits 28 one interrupt enabling bit for a device interrupt request received on pin 10 and another interrupt enabling bit for a device interrupt request received on pin 15.

Figure 2:
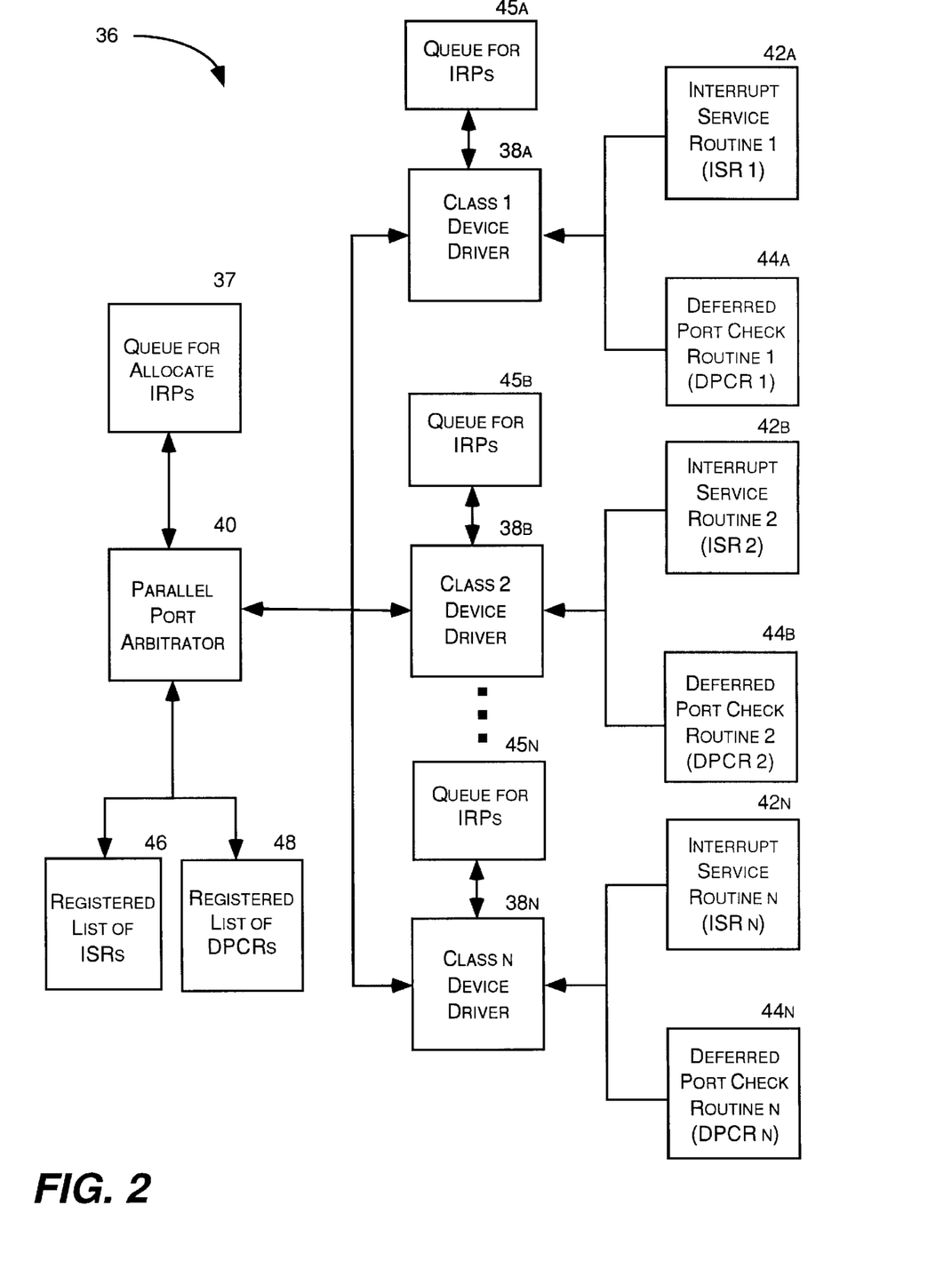
FIG. 2 is a functional block diagram of a parallel port driver according to the present invention.

FIG. 2 is a block diagram of the preferred structure of the port driver 36. The port driver 36 includes class device drivers 38a through 38n and a port arbitrator 40. Each class device driver has associated with it an interrupt service routine (ISR) 42a through 42n and a deferred port check routine (DPCR) 44a through 44n. Other class device drivers (not shown) may include an interrupt service routine (ISR) but may not include a deferred port check routine (DPCR), such as a driver for a master/slave device. Other class device drivers (not shown) may include neither an interrupt service routine (ISR) nor a deferred port check routine (DPCR), such as a driver for a non-interrupt device.

A class device driver 38x conducts I/O communication with a peripheral device 32x by transmitting an I/O request packet (IRP) to the peripheral device. An I/O request packet (IRP) is a waitable unit of programming code and data that can be queued for execution by the CPU 12. An I/O request packet (IRP) specifies the particulars of a specific I/O communication such as how many bytes of data, where to get the data, where to send the data, which buffer to use, etc. Each class device driver 38a through 38n has associated with it a queue 45a through 45n for I/O request packets (IRPs). The port arbitrator 40 has associated with it a queue 37 for allocate requests, a registered list 46 of interrupt service routines (ISRs), and a registered list 47 of deferred port check routines (DPCRs).

It is preferred that separate queues 45a through 45n be provided for each class device driver 38a through 38n and that another queue 37 be provided for the port arbitrator 40 to provide flexibility in the operation of the port driver 36. For example, such a structure provides for a higher level of control exerted over the processing of I/O request packets (IRPs) to allow a priority system to be implemented in the processing of I/O request packets (IRPs).

Figure 3:
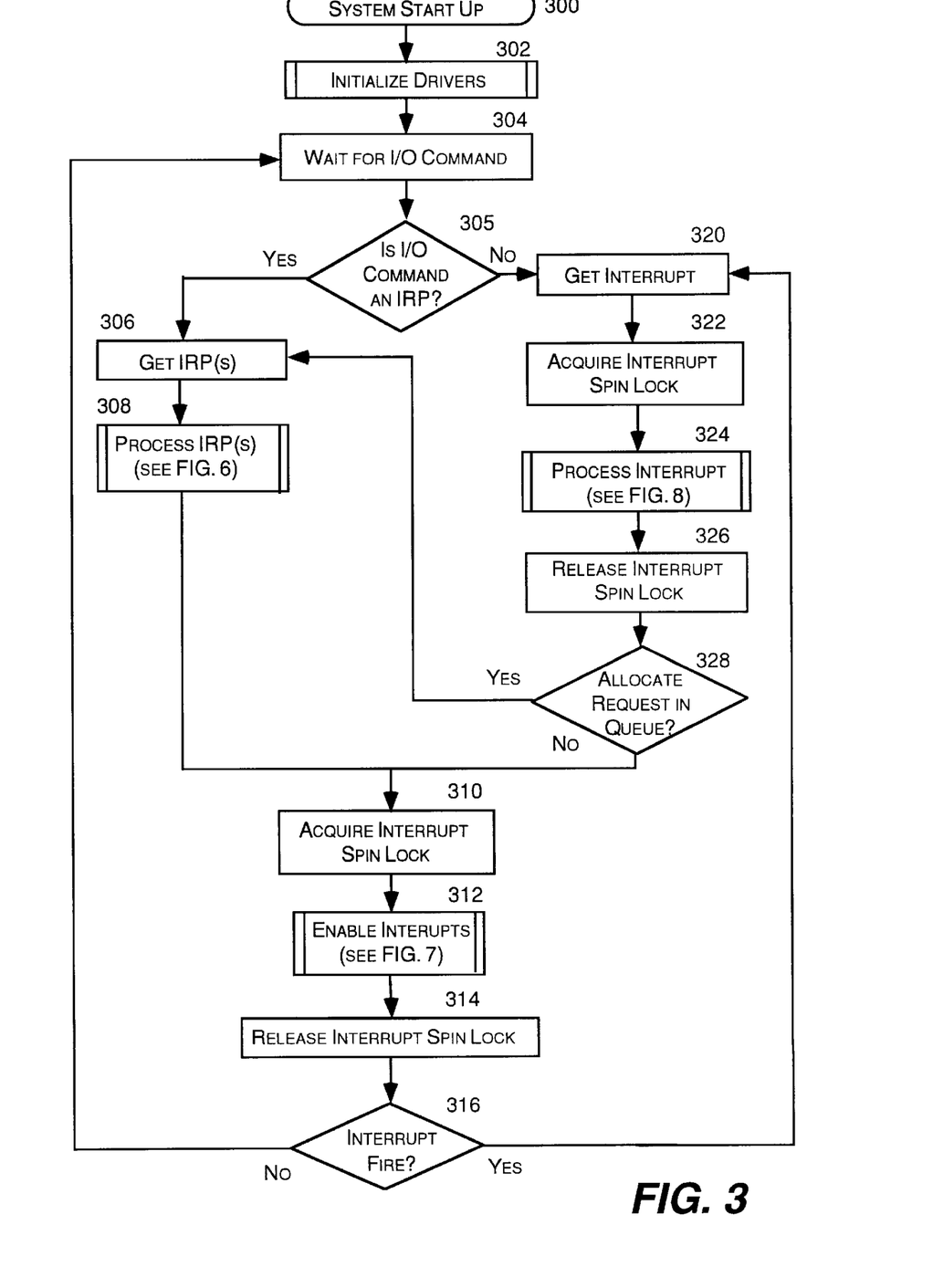
FIG. 3 is a logical flow diagram showing the steps of a computer-implemented process for controlling the operation of a parallel port.
Figure 4:
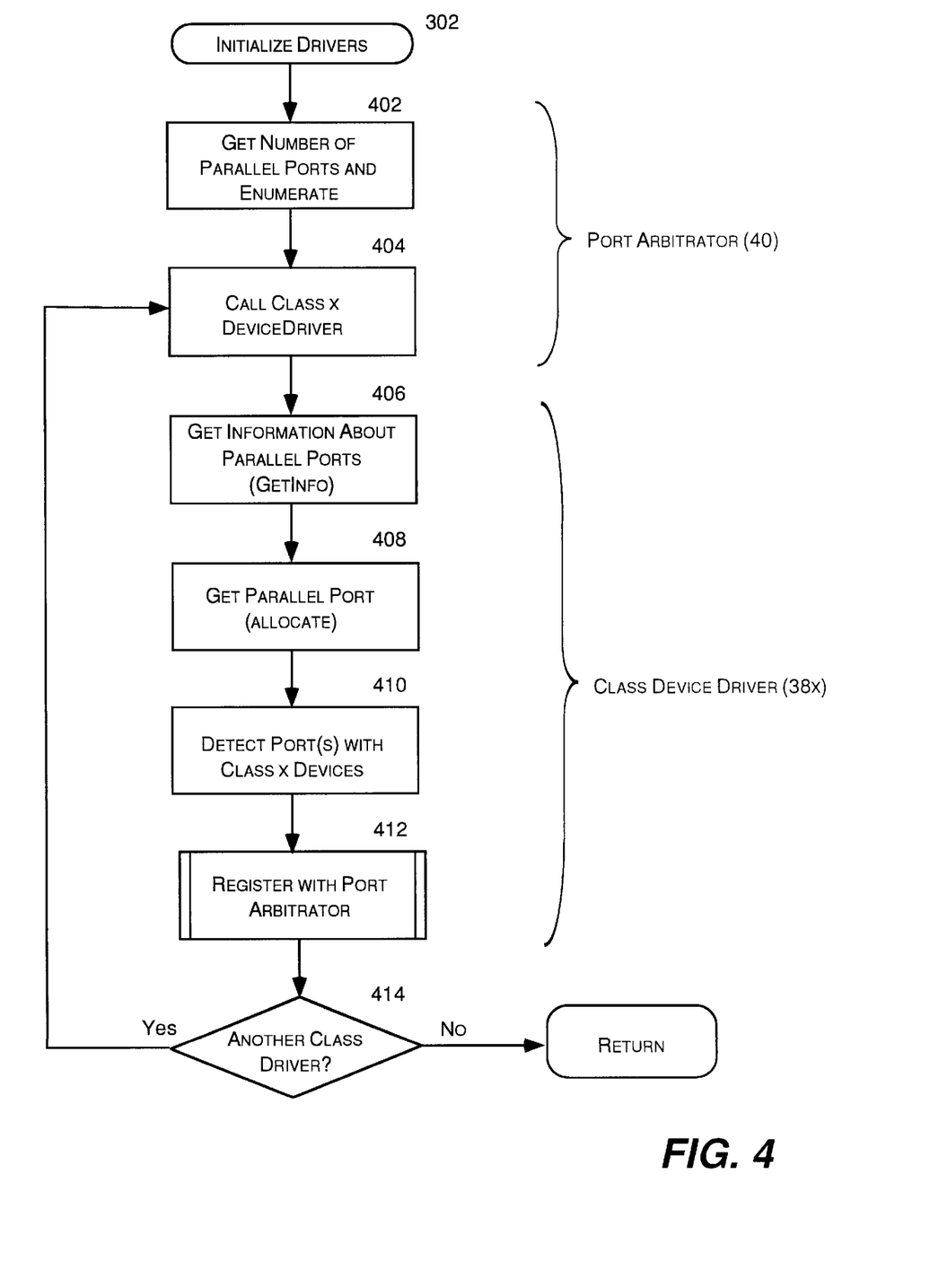
FIG. 4 is a logical flow diagram showing the steps of a computer-implemented process for initializing class device drivers.

Referring to FIGS. 1, 3, and 4, FIG. 3 is a logical flow diagram for the preferred computer-implemented process 300 for operating the port driver 36. Computer-implemented process 300 begins upon system start up or boot up with routine 302, initialization of the port driver 36. FIG. 4 illustrates the steps associated with routine 302 (from FIG. 3) for initializing the port drivers such as port driver 36. In step 402 the port arbitrator 40 communicates with the multiplexer 30 to determine the number of multiplexer input ports 33a through 33n and enumerates the multiplexer input ports and the peripheral devices connected to the multiplexer input ports for future reference. The port arbitrator 40 then calls each class device driver 38a through 38n in sequence in step 404. A class device driver 38x gets the number of multiplexer input port 33x from port arbitrator 40 and in step 406 places a "GetInfo" command directed to each multiplexer input port. Each peripheral device 32a through 32n connected to the computer system 8 via the multiplexer 30 responds to the "GetInfo" command by providing information including the communication protocol used by each peripheral device. In step 408 the class device driver 38x then places an "Allocate" command to gain exclusive control over the parallel port (such as the parallel port associated with memory address port 23). In step 410 the class device driver 38x then interrogates each peripheral device 32a through 32n connected to the multiplexer 30 to determine which peripheral devices are in the class supported by the class device driver 38x. The class device driver 38x then registers its interrupt service routine (ISR) and deferred port check routine (DPCR) with the port arbitrator 40 in routine 412 as described below. Step 414 then loops back to step 404 until all of the device drivers 38a through 38n have been called and have interrogate the attached peripheral devices 32a through 32n.

Referring now to FIGS. 1, 3, 4, and 5, FIG. 5 shows the steps of routine 412 (from FIG. 4) for class device drivers 38a through 38n for registering with the port arbitrator 40. There are three paths in routine 412, a first path 502 for class device drivers for non-interrupt devices, a second path 504 for class device drivers for master/slave devices, and a third path 506 for class device drivers for peer-to-peer devices. Non-interrupt devices do not use interrupt service routines (ISRs) or deferred port check routines (DPCRs). Therefore, the first path 502 proceeds directly to step 508 in which routine 412 issues a "Free" command to release the parallel port.

Figure 5:
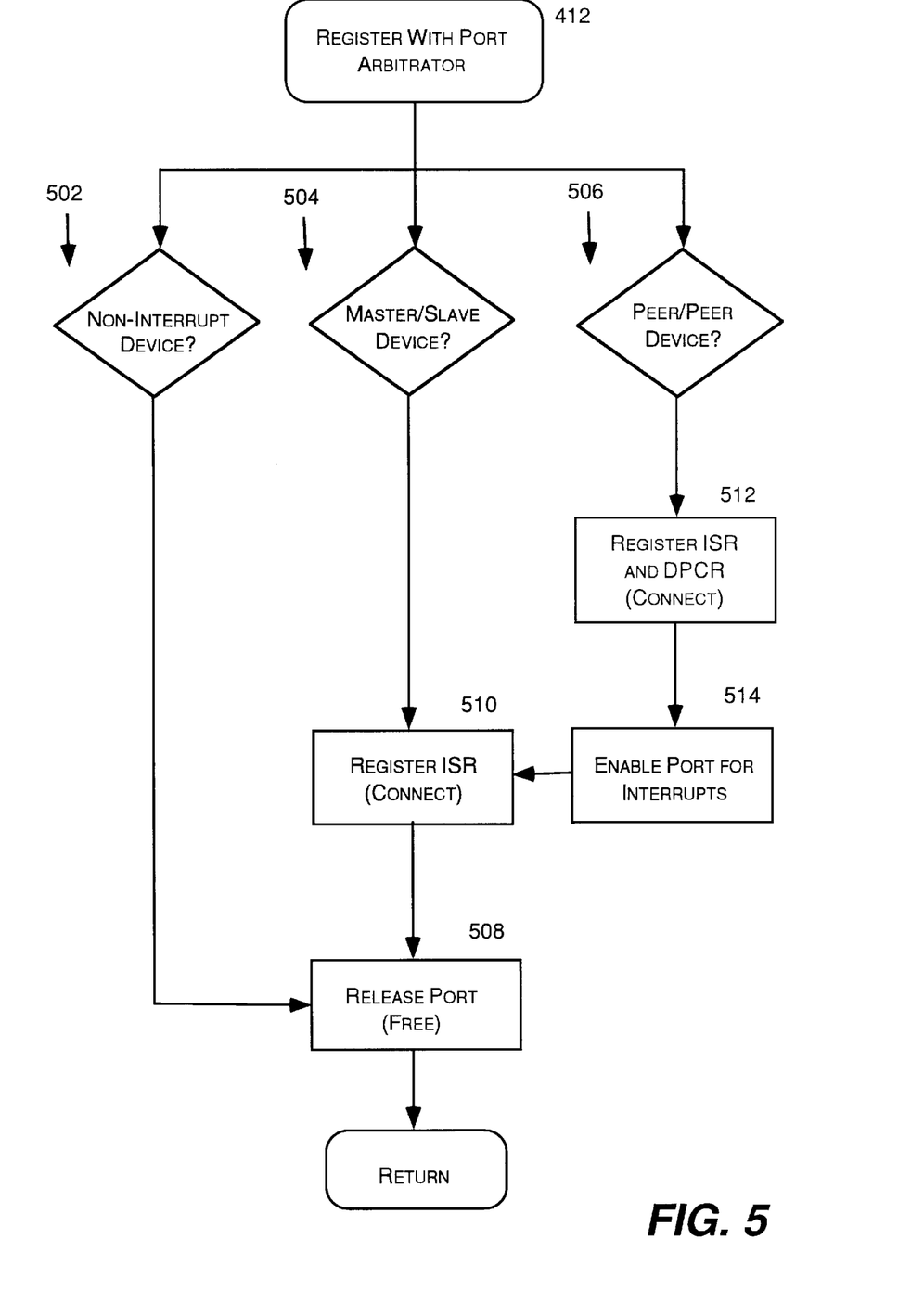
FIG. 5 is a logical flow diagram showing the steps of a computer-implemented process for registering class device drivers with a port arbitrator.

The second path 504 is for Master/slave devices. Master/slave devices use device interrupt request signals that are not disabled by other device drivers. Therefore, the second path 504 proceeds to step 510 in which an interrupt service routine (ISR) is registered with the port arbitrator and then to step 508 in which the parallel port is released.

The third path 506 is for peer-to-peer devices. Peer-to-peer devices use device interrupt requests that may be disabled by other device drivers. Therefore, path 506 proceeds to step 512 in which a deferred port check routine (DPCR) is registered with the port arbitrator, and then to step 514 in which the interrupt control bits 28 are set in order to enable the I/O card 18 to accept device interrupt requests from peer-to-peer devices. Path 506 then proceeds to step 510 in which an interrupt service routine (ISR) is registered with the port arbitrator 40 and then to step 508 in which the parallel port is released.

It will be appreciated that upon the completion of initialization routine 302, the port arbitrator 40 will have a registered list of interrupt service routines (ISRs) for each class device driver that supports one or more peripheral devices that use device interrupt requests (i.e., master/slave and peer-to-peer devices) and a registered list of deferred port check routines (DPCRs) for each class device driver that supports peripheral devices that use device interrupt requests that can be disabled by other class device drivers (i.e., peer-to-peer devices).

Once the port driver 36 has been initialized in routine 302 (FIG. 3), the computer-implemented process 300 proceeds to step 304 where the process waits for an I/O command from the CPU 12 or from the I/O card 18. When an I/O command is received by the port driver 36, the process proceeds to step 305. An I/O command may be an I/O request packet (IRP) generated by the CPU 12, or it may be a CPU interrupt request fired by the I/O card 18. If at step 305 the process determines that the I/O command is an I/O request packet (IRP), computer-implemented process 300 retrieves the I/O request packet (IRP) in step 306 and processes the I/O request packet (IRP) in routine 308. The sub-steps associated with step 308 for processing an I/O request packet (IRP) will be described with more particularity with respect to FIG. 6. Alternatively if the I/O command is a CPU interrupt request fired by the I/O card 18, the process follows the "NO" branch from step 305 to step 320.

Figure 7:
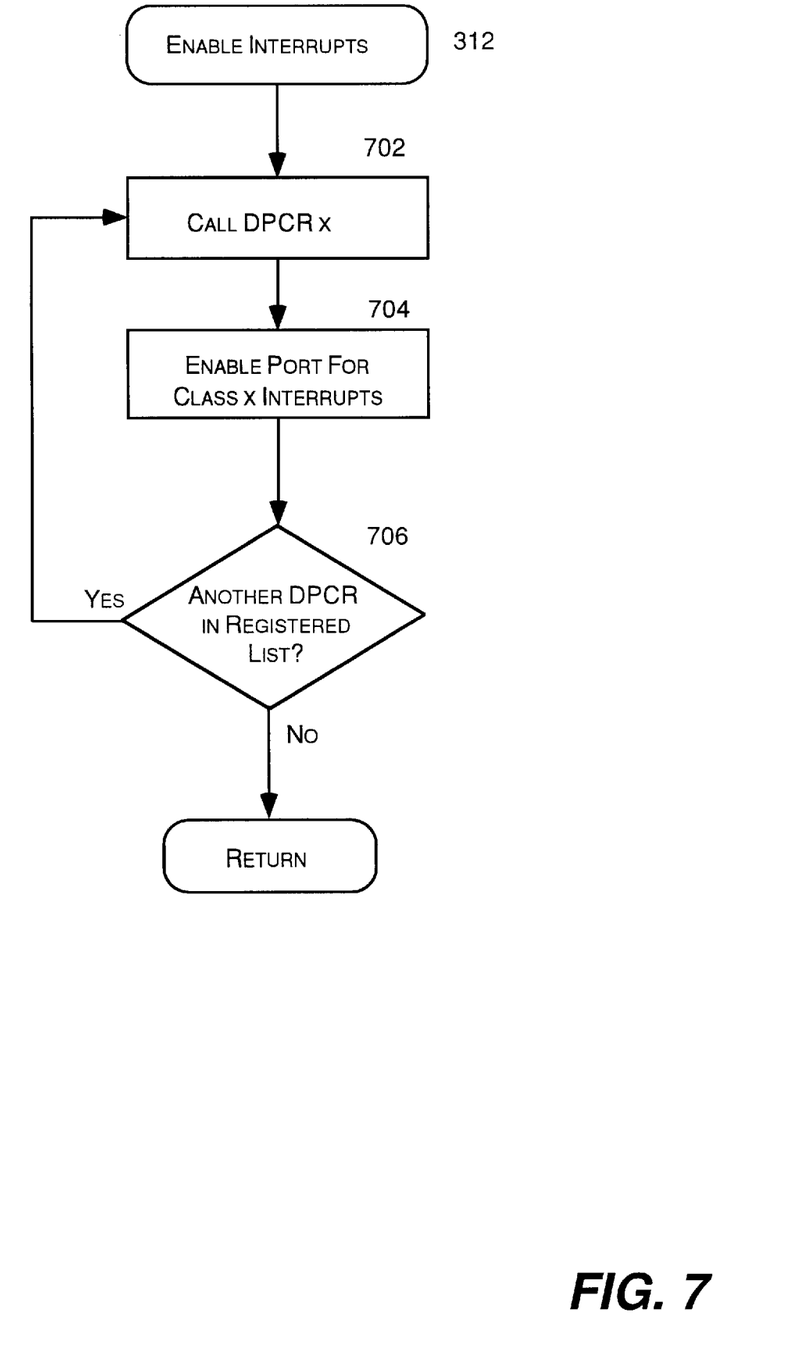
FIG. 7 is a logical flow diagram showing the steps of a computer-implemented process for enabling interrupt requests.

After all I/O request packets (IRPs) have been processed at step 308, computer-implemented process 300 acquires the interrupt spin lock in step 310. Acquiring the interrupt spin lock prevents all other program modules, particularly the class device drivers 38a through 38n, from allocating (i.e., gaining exclusive control over) the parallel port. Computer-implemented process 300 then enables device interrupt requests in routine 312. The sub-steps associated with step 312 for enabling device interrupt requests will be described with more particularity with respect to FIG. 7. Computer-implemented process 300 then releases the interrupt spin lock in step 314 which allows the I/O card 18 to fire a CPU interrupt request if a device interrupt request has been latched from a peripheral device.

Still referring to FIGS. 1 and 3, I/O card 18 may fire a CPU interrupt request in step 316. If it does not fire a CPU interrupt request, the "NO" branch is followed back to step 304 in which the computer-implemented process waits for an I/O command. If a CPU interrupt request does fire in step 316, the "YES" branch is followed to step 320 in which the computer-implemented process gets a CPU interrupt request from the I/O card 18. In step 322 the computer-implemented process 300 acquires the interrupt spin lock, and in routine 324 the CPU interrupt request is processed. The steps associated with routine 324 for processing an interrupt request will be described with more particularity with respect to FIG. 8.

After the CPU interrupt request has been processed, computer-implemented process 300 releases the spin lock in step 326. Computer-implemented process 300 monitors the status of the allocate request queue 37 and determines in step 328 whether there is an allocate request in the queue 37 (i.e., whether one or more I/O request packets (IRPs) was received while the CPU interrupt request was being processed). If there is an allocate request in the queue 37, the "YES" branch is followed to step 306 in which the computer-implemented process 300 gets the associated I/O request packet (IRP). If there is not an allocate request in the queue 37, the "NO" branch is followed to steps 310 through 316 in which the port is enabled for device interrupt requests.

Computer-implemented process 300 will process I/O commands including I/O request packets (IRPs) and CPU interrupt requests by looping through the steps 304 through 328 as long as the computer system 8 is powered up. It will be appreciated that computer-implemented process 300 provides a method for processing I/O commands whereby the I/O card 18 is routinely enabled to receive device interrupt requests from peer-to-peer devices. Thus, the port will routinely be enabled to allow peer-to-peer devices to initiate I/O communications through device interrupt requests even if a class device driver 38x disables the I/O card 18 for such a device interrupt request in the course of processing an I/O request packet (IRP). A multiplexer 30 can therefore be used to selectively connect a single parallel port to peer-to-peer devices and to other peripheral devices that disable device interrupt requests used by the peer-to-peer devices.

Referring to FIGS. 1, 2, 3, and 6, FIG. 6 shows the steps of routine 308 (from FIG. 3) for processing I/O request packets (IRPs). A class device driver 38x gets an I/O request packet (IRP) in step 602, which may come directly from the CPU 12 in accordance with instructions from the operating system 21 or which may come from a queue 45x (FIG. 2).

Figure 6:
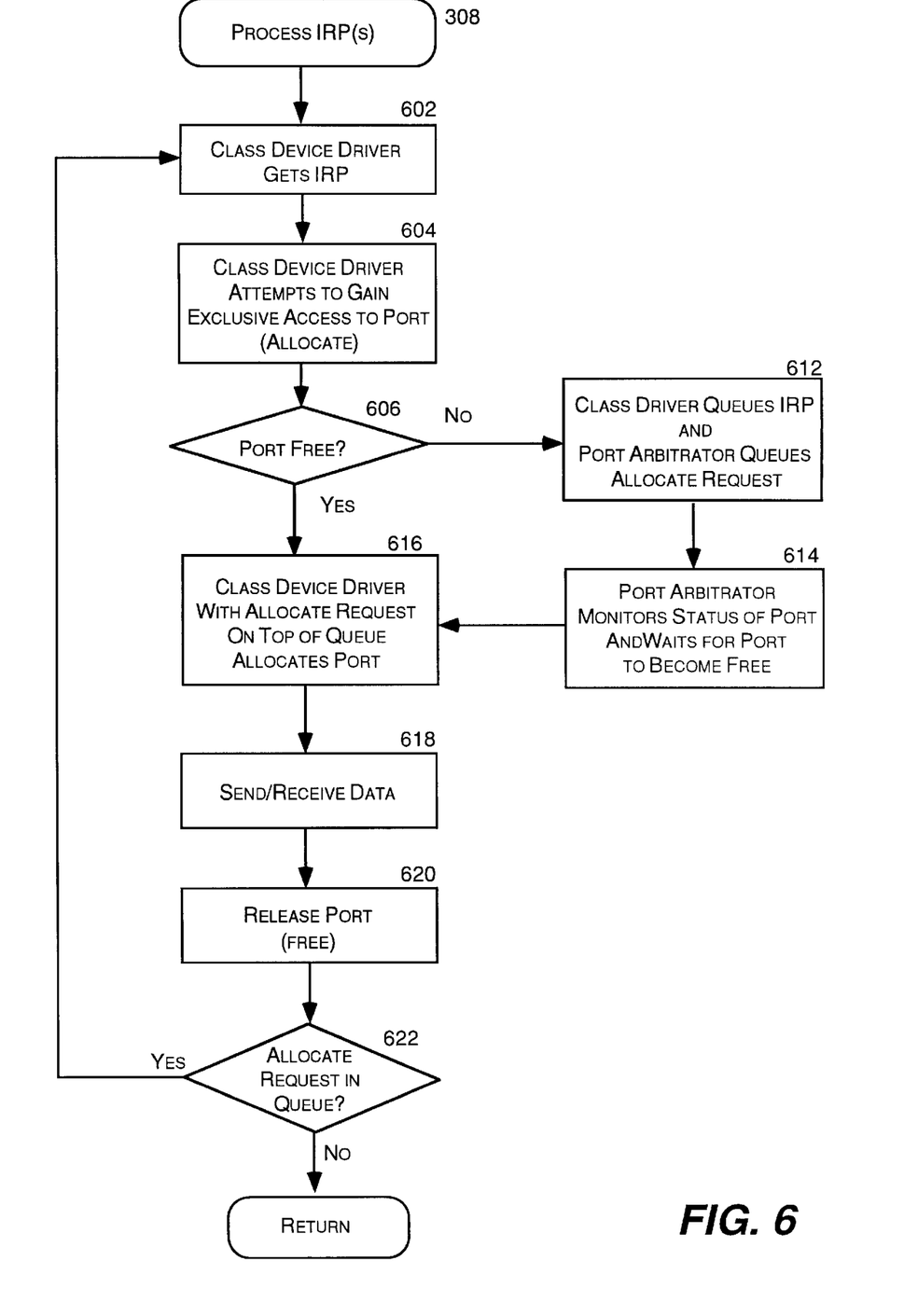
FIG. 6 is a logical flow diagram showing the steps of a computer-implemented process for processing I/O request packets.

The class device driver 38x then attempts to gain access over the parallel port by issuing an "Allocate" command in step 604, and it is determined whether the parallel port is free in step 606. If the parallel port is not free, the "NO" branch is followed to step 612 in which the class device driver 38x places the I/O request packet (IRP) in its I/O request packet (IRP) queue 45x, and the port arbitrator 40 places the allocate request in queue 37. The port arbitrator 40 then monitors the status of the parallel port and waits for the parallel port to become free in step 614. Once the parallel port becomes free and the allocate request for class device driver 38x is on the top of the queue 37, class driver 38x allocates the parallel port in step 616. In step 618 the class device driver 38x sends or receives data to or from its peripheral device 32x in accordance with the I/O request packet (IRP) instructions and then releases the parallel port by issuing a "Free" command in step 620.

Referring back to step 606, if the parallel port is free the "YES" branch is followed from step 606 directly to step 616 and then to step 618. In step 618 the class device driver 38x sends or receives data to or from its peripheral device 32x in accordance with the I/O request packet (IRP) instructions and then releases the parallel port by issuing a "Free" command in step 620. Also in step 618 the device driver 38x sets the control registers 26, including interrupt control bits 28, on the I/O card 18 to the proper state for communicating with the peripheral device 38x. In step 622 the port arbitrator 40 determines whether there is another allocate request in the queue 37. If the answer is yes, the "YES" branch loops back to step 602, and the next I/O request packet (IRP) is processed. If the answer is no, the "NO" branch is followed to the "RETURN" step, and the computer-implemented process 300 continues with step 310.

Routine 308 loops through steps 602 through 622 until all of the allocate requests in queue 37 have been processed. When routine 308 reaches the "RETURN" step, the queue 37 is empty, and the parallel port is idle. After the last I/O request packet (IRP) has been processed, the interrupt control bits 28 included in the control registers 26 on the I/O card 18 may be left in a state that disables the I/O card 18 from firing a CPU interrupt request to IRQ pin 35 on CPU 12 in response to a device interrupt request latched by a peer-to-peer peripheral device. Therefore, when the queue 37 is empty and the port is idle, computer-implemented process 300 enables the I/O card 18 to receive device interrupt requests from peer-to-peer devices in steps 310 through 314. The port arbitrator 40 or another program module could be programmed to use many other conditions to trigger the steps for enabling the port to receive device interrupt requests from peer-to-peer devices. For example, device interrupt requests could be enabled after a predetermined number of clock cycles or when a certain number of allocate requests are in queue 37. Similarly, a higher level program module could trigger the enabling steps in accordance with a priority system or some other logic.

Referring now to FIGS. 1, 2, 3, and 7, FIG. 7 shows the steps of routine 312 (from FIG. 3) for enabling device interrupt requests. Each deferred port check routine (DPCR) 44x (FIG. 2) includes the instructions and information necessary to set the interrupt control bits 28 in order to enable the I/O card 18 to receive a device interrupt request and to fire a CPU interrupt request to IRQ pin 35 on CPU 12. The CPU interrupt request is fired in response to a device interrupt request latched on the I/O card 18 by a peripheral device 32x supported by the class device driver 38x. Routine 312 calls each deferred port check routine (DPCR) 44a through 44n in the registered list 48 in step 702. A deferred port check routine (DPCR) 44x enables the I/O card 18 to receive device interrupt requests from its class of peripheral devices 32x in step 704. In step 706 it is determined whether there is another deferred port check routine (DPCR) in the registered list 48 maintained by the port arbitrator 40. If the answer is yes, the "YES" branch is followed back to step 702 in which the next deferred port check routine (DPCR) is called. If the answer is no, the "NO" branch is followed to the "RETURN" step and computer-implemented process 300 continues with step 314. It will be appreciated that upon completion of routine 312 device interrupt requests from all peer-to-peer devices are enabled.

Referring now to FIGS. 1, 2, 3, and 8, FIG. 8 shows the steps of routine 324 (from FIG. 3) for processing CPU interrupt requests. The I/O card 18 is connected to a single IRQ pin 35 on CPU 12. Therefore, the port arbitrator 40 in routine 324 identifies the correct class device driver 38x to respond to a CPU interrupt request. Some multiplexers, such as multiplexer 30, have the intelligence to inform the port arbitrator 40 which peripheral device generated a particular device interrupt request. In step 802 the port arbitrator 40 determines whether the multiplexer can supply this information. If it can, the "YES" branch is followed to step 804 in which the peripheral device 32x that generated the interrupt request is identified. The port arbitrator 40 then calls the interrupt service routine (ISR) 42x from the correct class device driver 38x in step 806, and the class device driver 38x obtains exclusive control over the parallel port by placing a "TryAllocate" command. In step 810 the class device driver 38x sends or receives data to service the interrupt request. The parallel port is then freed in step 812 using a "Free" command. Step 812 is followed by the "RETURN" step in which the computer-implemented process 300 continues processing with step 326.

Figure 8:
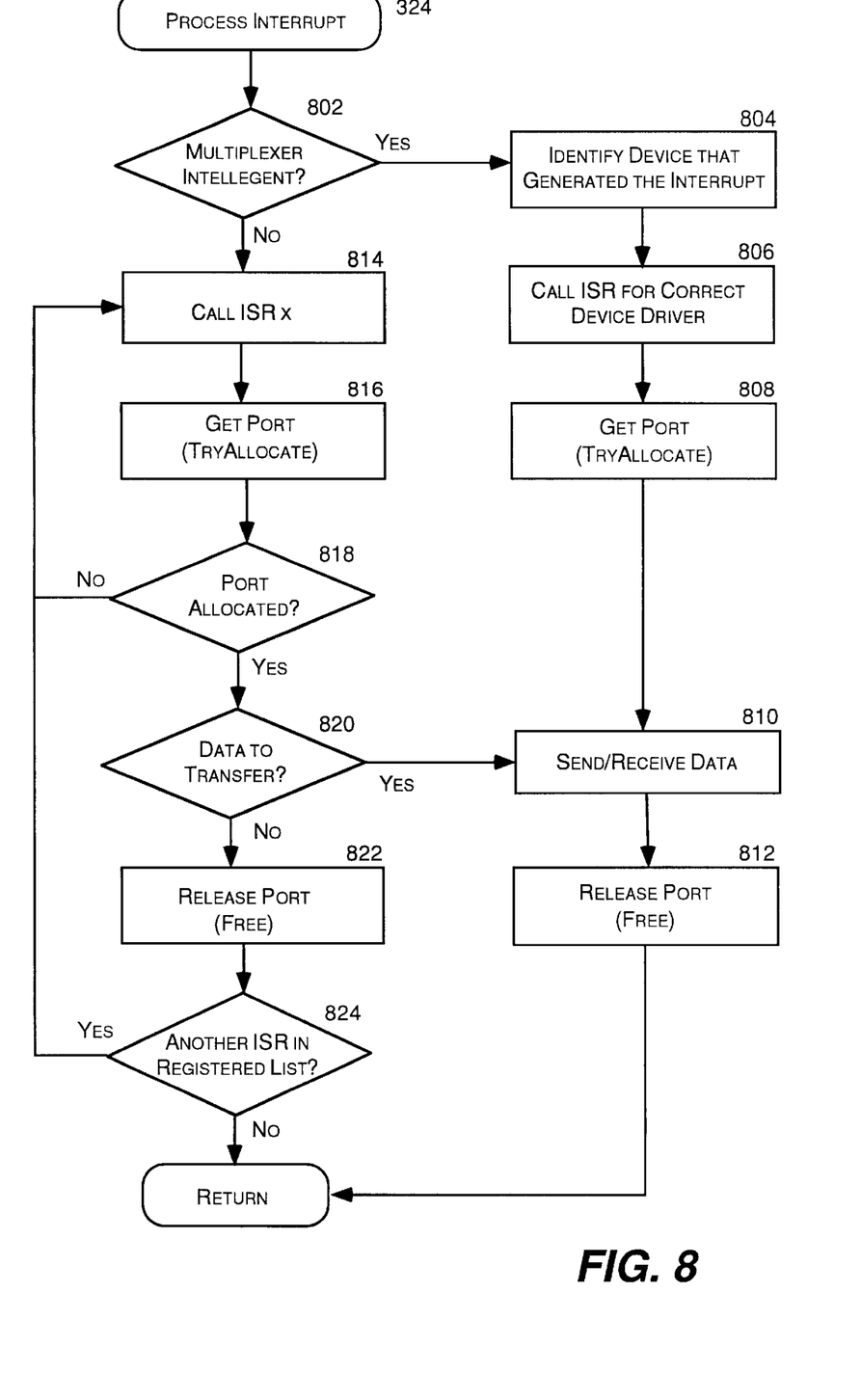
FIG. 8 is a logical flow diagram showing the steps of a computer-implemented process for processing interrupt requests.

If the multiplexer 30 cannot identify the peripheral device 32x that generated the interrupt request, routine 324 follows the "NO" branch from step 802 to steps 814 through 824 in which the peripheral devices 32a through 32n are sequentially polled until a peripheral device requiring interrupt service is identified. In step 814 the first interrupt service routine (ISR) in the registered list 46 is called. The called class device driver 32a attempts to obtain control over the parallel port by issuing a "TryAllocate" command in step 816. In step 818 the "TryAllocate" command will allocate the parallel port if the parallel port is free, or the attempt to allocate will fail if the parallel port is not free. If the parallel port is allocated in response to the "TryAllocate" command, the "YES" branch is followed from step 818 to step 820 in which it is determined whether the peripheral device 32a requires interrupt service because there is data to sent to or to be receive from the peripheral device 32a. If there is data to transfer, the "YES" branch is followed from step 820 to step 810 in which the data is transferred and then to step 812 in which the parallel port is released. Step 812 is followed by the "RETURN" step in which the computer-implemented process 300 continues processing with step 326.

If the parallel port is not allocated in step 818, the "NO" branch loops back to step 814, and the next interrupt service routine (ISR) in the registered list 46 of interrupt service routines (ISRs) maintained by the port arbitrator 40 is processed. If the port is allocated in step 818, the class device driver 38x determines whether the peripheral device 32x requires interrupt service in step 820. If there is no data to transfer in step 820, the parallel port is released in step 822. It is then determined in step 824 whether there is another interrupt service routine (ISR) in the registered list 46. If the answer is yes, the "YES" branch loops back to step 814, and the next interrupt service routine (ISR) in the registered list 46 is processed. If the answer is no, the "NO" branch is followed from step 824 to the "RETURN" step in which the computer-implemented process 300 continues processing with step 326.

It will be appreciated that routine 324 polls each peripheral device 32a through 32n until a peripheral device requiring interrupt service is identified or until each interrupt service routine (ISR) in the registered list 46 has been called. If the multiplexer 30 does not associate a particular peripheral device with a particular device interrupt request in the queue 34, routine 324 will respond to a device interrupt request by finding the first interrupt service routine (ISR) in the registered list 46 that has a peripheral device requiring interrupt service. Thus, device interrupt requests will be processed in the order in which interrupt service routine (ISR)s are placed on the registered list 46 rather than in the order in which the multiplexer 30 received the device interrupt requests and placed them in queue 34. This is a desirable feature of the present invention that allows the WINDOWS NT version 3.5 operating system to support older multiplexers that have little or no intelligence.

It should be understood that the foregoing relates only to the preferred embodiment of the present invention, and that numerous changes may be made therein without departing from the spirit and scope of the invention as defined by the following claims.

What is claimed is:

1. A method for controlling the flow of data through an I/O port in a computer system having a memory and a CPU, the I/O port being connected to the CPU and to first and second peripheral devices, the CPU being operable for creating I/O request packets for transmitting data to and receiving data from the first and second peripheral devices, comprising the steps of:

transmitting a first I/O request packet from the CPU to a first device driver for delivery to the first peripheral device;

allocating control over the I/O port to the first device driver;

commencing transmission of the first I/O request packet from the first device driver to the first peripheral device via the I/O port;

transmitting a second I/O request packet from the CPU to a second device driver for delivery to the second peripheral device;

queuing an allocate request associated with the second I/O request packet in a queue;

completing transmission of the first I/O request packet from the first device driver to the first peripheral device via the I/O port;

freeing the I/O port from control of the first device driver;

retrieving the allocate request from the queue;

allocating control over the I/O port to the second device driver;

transmitting the second I/O request packet to the second peripheral device; and in response to a predefined condition, enabling the I/O port to receive first and second device interrupt requests from the first and second peripheral devices and to transmit first and second CPU interrupt requests to the CPU in response to thereto.

2. The method of claim 1, wherein the method further includes the steps of:

configuring a control register to define a first protocol for the first peripheral device and reconfiguring a control register to define a second protocol for the second peripheral device.

3. The method of claim 2, wherein enabling the I/O port includes setting the first and second interrupt control bits in the control register.

4. The method of claim 1, wherein in response to the predefined condition, the port arbitrator causes the control register to be configured to enable the I/O port to receive interrupt requests from the second peripheral device.

5. The method of claim 1, wherein the predefined condition comprises:

the queue is empty and the I/O port is idle.

6. The method of claim 5, wherein the predefined condition comprises:

the queue is empty and the I/O port is idle.

7. A apparatus for controlling the flow of data through an I/O port in a computer system including a system bus interconnecting, a CPU, and a memory, comprising:

an I/O card interconnecting the system bus and first and second peripheral devices by means of a multiplexer, wherein the I/O card includes a control register for defining first and second protocols for communicating with the first and second peripheral devices respectively, an operating system program comprising:

first and second device drivers for transmitting allocate requests, for allocating control over the I/O port, for configuring the control register to define the first and second control protocols respectively, and for transmitting I/O request packets from the CPU to the first and second peripheral devices respectively and a port arbitrator for monitoring the status of the I/O port, for queuing allocate requests from the first and second device drivers that are transmitted while the I/O port is allocated, for allowing a selected device driver having an allocate request in the queue to allocate the I/O port when the I/O port becomes free, and in response to a predefined condition, for causing first device driver to configure the control register to enable the I/O port to device receive first device interrupt requests from the first peripheral device and transmit first CPU interrupt requests to the CPU.

8. The apparatus of claim 7, wherein in response to the predefined condition, the port arbitrator causes the control register to be configured to enable the I/O port to receive interrupt requests from the second peripheral device.

9. The apparatus of claim 7, wherein the predefined condition comprises:

the queue being empty; and the I/O port being idle.

10. A storage medium on which is stored a computer program for controlling the flow of data through an I/O port in a computer system having a memory and a CPU, the I/O port being connected to the CPU and to first and second peripheral devices, the CPU being operable for creating I/O request packets for transmitting data to and receiving data from the first and second peripheral devices, comprising the steps of:

transmitting a first I/O request packet from the CPU to a first device driver for delivery to the first peripheral device;

allocating control over the I/O port to the first device driver;

commencing transmission of the first I/O request packet from the first device driver to the first peripheral device via the I/O port;

transmitting a second I/O request packet from the CPU to a second device driver for delivery to the second peripheral device;

queuing an allocate request associated with the second I/O request packet in a queue;

completing transmission of the first I/O request packet from the first device driver to the first peripheral device via the I/O port;

freeing the I/O port from control of the first device driver;

retrieving the allocate request from the queue;

allocating control over the I/O port to the second device driver;

transmitting the second I/O request packet to the second peripheral device; and in response to a predefined condition, enabling the I/O port to receive first and second device interrupt requests from the first and second peripheral devices and to transmit first and second CPU interrupt requests to the CPU in response to thereto.

11. The storage medium of claim 10, wherein the method further includes the steps of:

configuring a control register to establish a first protocol for the first peripheral device and reconfiguring a control register to establish a second protocol for the second peripheral device.

12. The storage medium of claim 11, wherein the enabling the I/O port includes setting the first and second interrupt control bits in the control register.

13. The storage medium of claim 10, wherein in response to the predefined condition, the port arbitrator causes the control register to be configured to enable the I/O port to receive interrupt requests from the second peripheral device.

14. The storage medium of claim 10, wherein the predefined condition comprises:

the queue is empty and the I/O port is idle.

15. The storage medium of claim 14, wherein the predefined condition comprises:

the queue is empty and the I/O port is idle.

* * * * *